June 1, 1965 H. EBEL 3,187,104
CIRCUIT FOR ELIMINATING ATTENUATION DIFFERENCES
IN COMMUNICATION LINES
Filed Sept. 18, 1961 2 Sheets-Sheet 1
Fig. 1
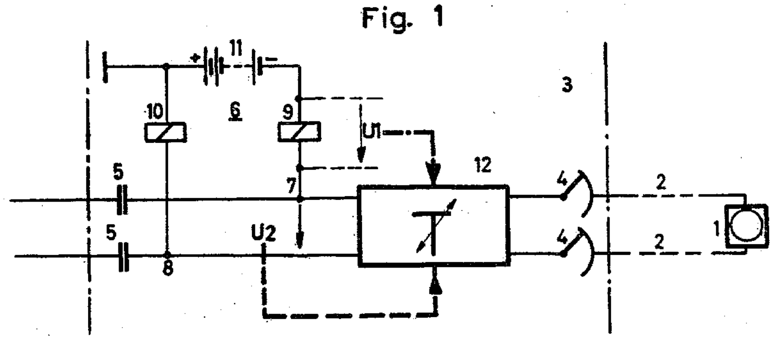
Fig. 2 Fig. 3
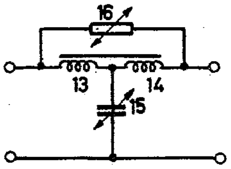
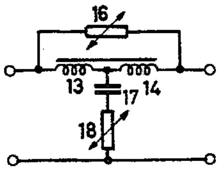
Fig. 4
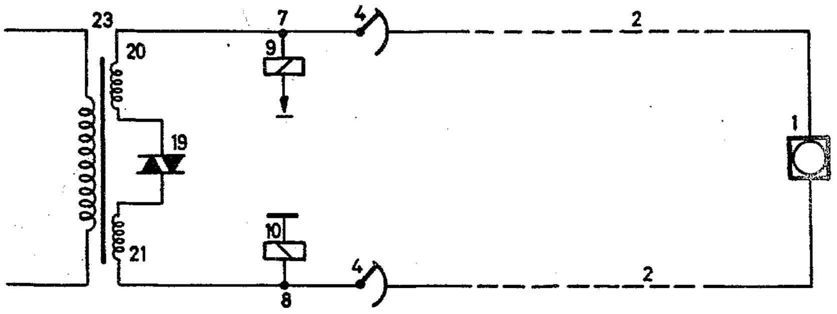

June 1, 1965 H. EBEL 3,187,104

CIRCUIT FOR ELIMINATING ATTENUATION DIFFERENCES IN COMMUNICATION LINES

Filed Sept. 18, 1961 2 Sheets-Sheet 2

3,187,104

CIRCUIT FOR ELIMINATING ATTENUATION DIFFERENCES IN COMMUNICATION LINES

Herbert Ebel, Munich, Germany, assignor to Siemens & Halske Aktiengesellschaft Berlin and Munich, a corporation of Germany Filed Sept. 18, 1961, Ser. No. 138,733
Claims priority, application Germany, Sept. 30, 1960, S 70,663
14 Claims. (Cl. 179—16)

Figure 5:
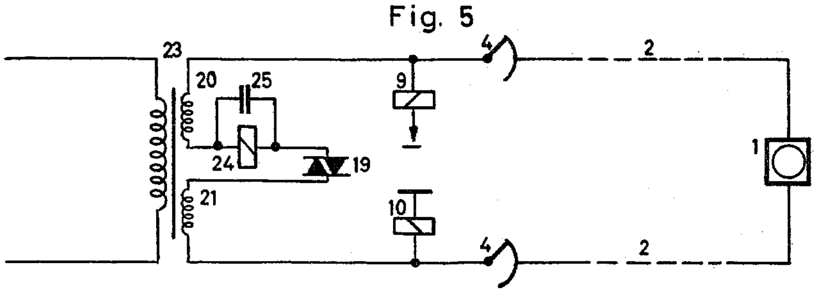

This invention is concerned with an arrangement for eliminating the attenuation differences caused by communication lines of different length.

It is in the communication art frequently necessary to transmit signals over lines of different length. This is, for example, the case in connection with telephone lines which may be of different length depending upon the distance of subscriber stations from an exchange. The signals transmitted over a communication line are from case to case differently attenuated depending upon the length of the involved line. This is generally undesirable and several suggestions have become known aiming at the elimination of this phenomenon.

For example, the electro-acoustic transducers for subscriber stations are being made with different sensitivity response, more sensitive transducers being installed at subscriber stations having lone lines and less sensitive transducers being used in connection with subscriber stations having relatively short lines. The disadvantage of this expedient resides in the necessity of having to produce and to keep in stock differently designed transducers and to assure by the employment of skilled personnel that proper transducers are at the concerned subscriber stations utilized and when necessary replaced.

It is also known to use, in connection with subscriber stations operating with microphone amplifiers or receiver amplifiers, regulatable amplifier elements, so that the degree of amplification can be matched to the prevailing line attenuation. Generally, the matching must again be carried out by skilled personnel unless there are to be provided relatively expensive measures for preventing self-excitation in the case of excessive amplification.

In addition to the above indicated expedients, which require skilled selection or adjustment of the transmission means at the subscriber stations, there are also known devices for automatically regulating the elimination of the attenuation differences occurring in connection with telephone lines.

One of these devices utilizes a non-linear resistor and an ohmic resistor inserted between the two line conductors of a tlephone line, the non-linear resistor being controlled by the battery feed current which is transmitted over the respective line, such current depending upon the length of the respective line.

Another suggestion for automatically compensating or equalizing the attenuation involves the provision, at a subscriber station, of a feedback receiver amplifier having a non-linear resistor in the feedback circut, such resistor being likewise controlled by the battery feed current and being in the case of long lines operative to increase the degree of amplification by positive feedback.

The automatically operating attenuation equalization has an advantage as compared with the first noted expedients, in that the regulation is effected automatically without requiring particularly experienced operating personnel. However, it is as compared with these expedients generally more complicated and more expensive. Moreover, the regulation in connection with a system with high resistance feed is very poor, since the loop current employed as a control value is largely independent of the direct current resistance of the communication line.

The object of the invention is to provide a circuit arrangement for automatically eliminating the attenuation differences between communication lines of different length, which permits a regulation even in the presence of high resistance battery feed resistors.

In a circuit arrangement in which a communication line serves for the transmission of communication signals as well as for the battery feed energy for a load at the end of the communication line, and wherein the communication line is connected to a common direct voltage source at least over one feed resistor, so that the battery feed resistor together with the input resistance of the communication line forms a voltage divider, the problem posed is according to the invention solved by connecting to the involved communication line a network adapted to pass direct current, such network having a controllable attenuation of the communication signals, the attenuation value of such network being controlled at least by one of the direct voltages obtained at the resistors of the voltage divider.

According to the invention, the solution for the posed problem does not only have the virtue of making elimination of the attenuation differences possible in the presence of high resistance battery feed resistors, but presents the considerable advantage that the circuit arrangement can be centrally disposed. Accordingly, it need not be associated with each individual subscriber station or each individual communication line the attenuation difference of which is to be compensated, but can be as signed as desired to one of a plurality of communication lines. This means, that its utilization, so far as its use in the communication line, which passes direct current, is better than in the known circuit arrangements. The supervision and maintenance of the circuit arrangement according to the invention is moreover considerably simplified as compared with the known arrangements which are provided at the individual subscriber stations.

Any one of the partial voltages which can be tapped at the voltage divider consisting of the battery feed resistors and the input resistance of a communication line, can be used as a control value for the network inserted in the communication line, which passes direct current, such network having a controllable attenuation of the communication signals. It is possible to use as a control value a partial voltage alone or to simultaneously use for this purpose a plurality of partial voltages. In the case of very high resistance battery fed resistors, the voltage at the latter will not be suitable as a control value for the controllable attenuation network; it will be necessary to use in such case as a control voltage direct voltage lying at the input resistor of the communication line, that is, the direct voltage between the two line conductors of the communication line at the place where such voltage is supplied.

In accordance with the invention, a non-linear resistor with thermistor conduction characteristic, is suitable for use as a controllable attenuation member, such resistor being at the battery feed-in point inserted in one line conductor of the respective communication line. A better although more elaborate solution resides in using as a controllable attention network a quadripole the characteristic transmission of which changes in accordance with the characteristic transmission of the communication line depending upon the length thereof. The transmission portion comprising the communication line and the quadripole acts thereby in the manner of a communication line of predetermined length. The input resistance of this transmission portion has a constant valve which can be accurately reproduced, thus eliminating in connection with subscriber lines of different length the problem of matching the substitution resistance to the apparent resistance of the respective subscriber lines. It should be considered in this connection that a known proposal for solving the problem suggested to construct the substitution of non-linear resistors and to match the substitution resistance to the respective different line lengths, utilizing the respective loop current as a control criterion.

A network the characteristic transmission of which changes according to the characteristic transmission of the communication line depending upon the length thereof, comprises, in accordance with another feature of the invention, for example, a quadripole having a T-bridge circuit with two transmission windings in the longitudinal branch, a controllable or adjustable capacitor in the transverse branch and a controllable or adjustable ohmic resistor in the bridge arm, wherein the control of the controllable elements is effected in such a manner that the resistance value increases upon increases of the capacitance value. As a controllable capacitor, there can be used a semiconductor diode the capacitance value of which changes depending upon the voltage connected thereto, or a fixed capacitor with an adjustable resistor serially connected therewith. The adjustable resistor can be constructed as a thermistor.

The various features and objects of the invention will appear in the course of the description of embodiments thereof which will be rendered presently with reference to the accompanying drawings.

Figure 6:
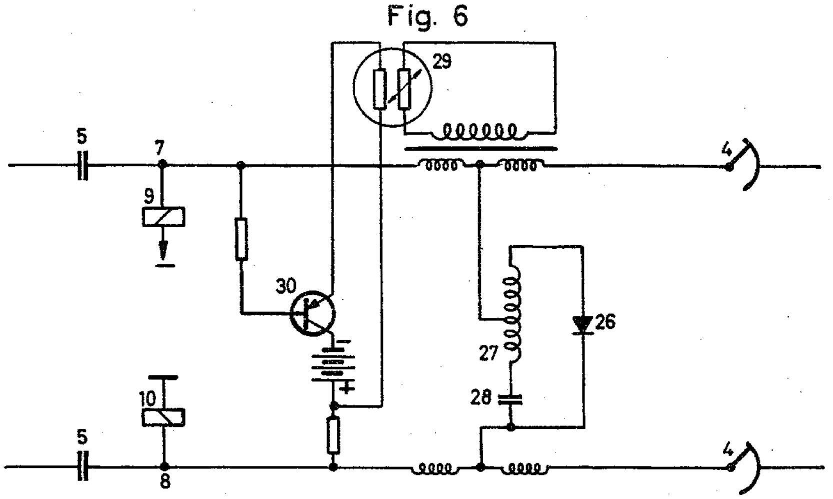
Figure 7:
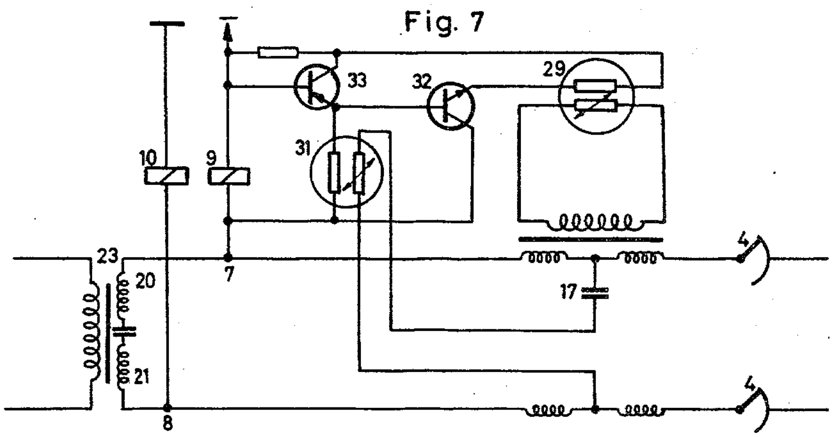

FIG. 1 indicates the principles applied in the invention in connection with a telephone subscriber line;

FIGS. 2 and 3 illustrate suitable structures for the controllable or adjustable attenuation network;

FIGS. 4 and 5 show practical embodiments employing respectively a non-linear resistor as a controllable attenuation element; and FIGS. 6 and 7 represent practical embodiments employing attenuation networks corresponding to those shown respectively in FIGS. 2 and 3.

Referring now to FIG. 1, numeral 1 indicates a subscriber station which is over a line having two conductors 2 connected with the subscriber line circuit 3 located in an exchange. Only those elements of the line circuit are shown which are necessary for an understanding of the invention. Numeral 4 indicates a line finder, 5 indicates the capacitor terminating the battery feed circuit, and numeral 6 indicates the battery feed bridge. This bridge connects in known manner the two line conductors of the subscriber line at points 7 and 8 to the centrally located common direct current source 11 over the windings 9 and 10 of the line relay, such windings acting as battery feed resistors. These two resistors 9 and 10 form with the resistance of the subscriber line, between the points 7 and 8, a voltage divider for the direct voltage.

The invention proposes to provide for the automatic elimination of the attenuation differences occurring in the case of lines of different length, a network 12, disposed in the line directly ahead of the feed-in points 7 and 8, such network being permeable to direct current and having a controllable attenuator for communication signals, the attenuation value being controllable at least by one direct voltage obtained at the resistors of the voltage divider.

The direct voltage U1 at the feed resistor 9 or the direct voltage U2 between the battery feed-in points 7 and 8 can, for example, be utilized as control voltage. It may be in some situations desirable to simultaneously use both voltages for the control. The direct voltage at one of the feed resistors is particularly suitable as control valve in the case of a low resistance feed bridge, while the direct voltage between the feed-in points 7 and 8 is particularly suitable in the case of a high resistance feed bridge. As is known, the latter changes, in the case of a direct current resistance of the feed resistors amounting respectively to 500 ohms and a resistance variation of the communication line 1 kilo ohm, in a ratio of about 1:6. With identical assumptions, the control value at the subscriber station, which is in prior arrangements used for the elimination of the attenuation difference of communication lines of different length, would change only in a ratio of 2:1.

In order to obtain the intended effect, namely, regulation for the purpose of eliminating the attenuation differences occurring in connection with communication lines of different length, it is necessary to carry out the control so that the attenuation of the attenuation network will be small in the case of a long communication line while being great in the case of a short communication line. When this is done, the total attenuation of the transmission portion comprising the communication line and the attenuation network, can be made independent of the length of the communication lines.

The quadripole shown in FIG. 2 consists of a T-bridge circuit with two transmission or repeater windings 13 and 14 in the longitudinal branch, an adjustable or controllable capacitor 15 in the transverse branch, and an adjustable ohmic resistor 16 in the bridge arm. In order to obtain the desired action, the control of the controllable elements must be effected so that the resistance value of the ohmic resistor increases responsive to increase of the capacitance value of the capacitor. It is with a quadripole of this kind very well possible to reproduce the transmission properties and the apparent resistance of a communication line with about 1 millimeter conductor diameter, with a range of about 0 to 5 kilometer length.

The T-bridge circuit shown in FIG. 3 comprises in addition to the elements 13, 14 and 16 of FIG. 2, a fixed capacitor 17 (taking the place of the controllable capacitor 15 of FIG. 2), and an adjustable resistor 18. In order to obtain the intended operation, the control of the resistors 16 and 18 must be effected in opposition.

FIG. 4 shows as a first practical embodiment a circuit arrangement having a non-linear resistor functioning as a controllable attenuation network. The non-linear resistor, for example, a varistor 19, is arranged between the two windings 20, 21 of the line repeater 23, being thus located in the voice current circuit of the subscriber station 1. The varistor 19 is controlled by the direct voltage lying between the feed-in points 7 and 8. In the case of great length of the communication line 2, the direct current resistance thereof will likewise be great, meaning, that the direct voltage between the feed-in points 7 and 8 is likewise relatively high, such high direct voltage controlling the non-linear resistor to the low resistance side. In the case of a long communication line with great damping for the communication signals, there will be a low alternating current in the voice current circuit, which practically does not weaken the communication signals. In the case of a short communication line, the direct voltage between the feed-in points 7 and 8 will be correspondingly lower; the non-linear resistor 19 is therefore operatively effected so as to present a higher differentiating resistance, such high differentiating resistance being accordingly operable to produce corresponding strong attenuation of the communication signals in the voice current circuit.

It is possible, with appropriate selection of the non-linear resistor 19, to maintain the attenuation of the communication signals in the voice current circuit independent of the length of the communication line.

The non-linear resistor 19 is in the circuit arrangement shown in FIG. 4 continuously connected between the feed-in points 7 and 8. This means, that the direct voltage source is loaded even when none of the subscribers accessible to the call finder is involved in a call. However, this unnecessary current consumption can be avoided by operatively connecting the non-linear resistor only when it is required, just as other centrally located switching devices are operatively connected only when needed. The loop current criterion, that is, the current flowing over the line loop when a call is initiated, may be utilized as a criterion for operatively connecting the non-linear resistor. The switching means required for this purpose are well known and understood and have therefore been omitted from the drawing.

In order to make the loop current criterion fully effective also for other operations required in the extension of calls, it is necessary that the relays controlled thereby are deenergized upon interruption of the loop circuit at the subscriber station. This would not be the case in the use of the circuit arrangement according to FIG. 4, even when assuming that the non-linear resistor is operatively connected only when needed, since the control current for the non-linear resistor 19 continues to flow as an energizing current over the relay windings 9 and 10 (battery feed resistors) even after interruption of the loop current at the subscriber station.

This drawback is remedied in the circuit arrangement shown in FIG. 5, comprising a further winding 24 for the line relay, such further winding being disposed in series with the non-linear resistor 19 and being connected in parallel with a capacitor 25. The number of turns of the relay winding 24 is identical with the total number of turns of the two windings 9 and 10, and is wound in a sense opposite to these latter windings. Accordingly, the energizing current for the non-linear resistor 19, flowing through all three windings, will operate in the winding 24 with identical magnitude but in opposite sense. The magnetic forces in the magnetic circuit of the line relay are thereby cancelled and the energization due to the control current is equal to zero. However, the loop current which flows responsive to the closure of the loop at the subscriber station, in the direct current circuit only through the windings 9 and 10, thus producing a fully effective magnetic flux in the magnetic circuit of the line relay.

The controllable attenuation network utilized in the embodiment according to FIG. 6 corresponds to the one illustrated in FIG. 2. The controllable capacitor is realized by the semiconductor diode 26 which operates in blocking direction, the capacitance value thereof decreasing responsive to increase of the direct voltage supplied. In the event that the capacitance value of this diode should not suffice, it can be increased in simple manner by the current limiting transformer 27. The semiconductor diode 26 is in the present case controlled by the direct voltage flowing between the battery feed-in points 7 and 8. In order to prevent a short circuit of this direct voltage, there is provided a cutoff capacitor 28 which is disposed in series with the transformer 27. The controllable resistor in the bridge circuit is realized by the thermistor 29 which is likewise controlled by the direct voltage flowing between the battery feed-in points 7 and 8. In order to prevent excessive increase of the direct current for the control, there is provided for the regulation of the thermistor 29 a transistor 30 which amplifies the direct current.

FIG. 7 shows a circuit arrangement which utilizes as a controllable attenuation network a quadripole according to FIG. 3. The two controllable resistors are realized by thermistors 29 and 31. The direct voltage obtained at the winding 9 of the line relay serves as control voltage. The thermistors 29 and 31 are not connected directly to this voltage but are connected thereto over transistors respectively indicated at 32 and 33 which are operative to amplify the direct current. The direct current amplification of the transistor 33 decreases responsive to increase of the direct current amplification of the transistor 32. The two thermistors 29 and 31 are accordingly controlled in opposition, such control having been noted as a requirement for the operation of the quadripole according to FIG. 3.

Changes may be made within the scope and spirit of the appended claims which define what is believed to be new and desired to have protected by Letters Patent.

I claim:

1. A circuit arrangement for eliminating the attenuation difference occurring in connection with communication lines of different length, wherein a communication line is utilized for the transmission of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising a network connected in the communication line and adapted to conduct direct current, said network having a controllable attenuator disposed in the signal path for effecting variable attenuation of the communication signals, and means for operatively connecting the attenuator to said network whereby the attenuation value of said attenuator is controllable by at least one of the direct voltages obtained at the resistors of said voltage divider.

2. A circuit arrangement according to claim 1, wherein said communication line comprises two line conductors, means forming feed-in points for feeding said direct voltage to said line conductors, said network comprising a non-linear resistor, and means for connecting the latter to one of said line conductors at said feed-in point.

3. A circuit arrangement for eliminating the attenuation difference occurring in connection with communication lines of different length, wherein a communication line is utilized for the transmission of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising, a network connected in the communication line and adapted to conduct direct current, said network having a controllable attenuator for communication signals, the attenuation value thereof being controllable by at least one of the direct voltages obtained at the resistors of said voltage divider, said communication line comprising two line conductors, means forming feed-in points for feeding said direct voltage to said line conductors, said network comprising a non-linear resistor, means for connecting the latter to one of said line conductors at said feed-in point, a transformer constituting a line repeater, and means for connecting said non-linear resistor between two partial windings of said transformer.

4. A circuit arrangement for eliminating the attenuation difference occurring in connection with communication lines of different length, wherein a communication line is utilized for the transmission of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising, a network connected in the communication line and adapted to conduct direct current, said network having a controllable attenuator for communication signals, the attenuation value thereof being controllable by at least one of the direct voltages obtained at the resistors of said voltage divider, said communication line comprising two line conductors, means forming feed-in points for feeding said direct voltage to said line conductors, said network comprising a non-linear resistor, means for connecting the latter to one of said line conductors at said feed-in point, a line relay having two windings respectively connected to said line conductors and operating as battery feed-in resistances, a further winding for said line relay, said further winding having a number of turns corresponding to the total turns of said two windings and being wound in opposite sense with respect thereto, means for connecting said further winding in series with said non-linear resistor, and a capacitor connected in parallel with said further winding.

5. A circuit arrangement for eliminating the attenuation difference occurring in connection with communication lines of different length, wherein a communication line is utilized for the transmission of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising, a network connected in the communication line and adapted to conduct direct current, said network having a controllable attenuator for communication signals, the attenuation value thereof being controllable by at least one of the direct voltages obtained at the resistors of said voltage divider, said communication line comprising two line conductors, means forming feed-in points for feeding said direct voltage to said line conductors, said network comprising a non-linear resistor, means for connecting the latter to one of said line conductors at said feed-in point, a transformer constituting a line repeater, a line relay having two windings respectively connected to said line conductors and operating as battery feed-in resistances, a further winding for said line relay, said further winding having a number of turns corresponding to the total turns of said two windings and being wound in opposite sense with respect thereto, a capacitor connected in parallel with said further winding, means for connecting said parallel connected further winding and capacitor in series with said non-linear resistor, and means for connecting said last named serially connected elements between two partial windings of said transformer.

6. A circuit arrangement for eliminating the attenuation difference occurring in connection with communication lines of different length, wherein a communication line is utilized for the transmission of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising, a network connected in the communication line and adapted to conduct direct current, said network having a controllable attenuator for communication signals, the attenuation value thereof being controllable by at least one of the direct voltages obtained at the resistors of said voltage divider, said communication line comprising two line conductors, means forming feed-in points for feeding said direct voltage to said line conductors, the voltage obtaining on said conductors at said feed-in points serving as a control value for the controllable damping of said network.

7. A circuit arrangement for eliminating the attenuation difference occurring in connection with communication lines of different length, wherein a communication line is utilized for the transmssion of communication signals as well as for the transmission of battery energy to a load disposed at the end of the communication line, and wherein the communication line is connected over at least one feed-in resistor to a common direct voltage source, whereby a voltage divider is formed by the feed-in resistor and the input resistance of the communication line, comprising, a network connected in the communication line and adapted to conduct direct current, said network having a controllable attenuator for communication signals, the attenuation value thereof being controllable by at least one of the direct voltages obtained at the resistors of said voltage divider, a quadripole constituting said network, said quadripole being formed by a T-bridge circuit having a longitudinal branch and a transverse branch and a bridge arm, comprising two transmission windings disposed in said longitudinal branch, a controllable capactor disposed in said transverse branch, and a controllable ohmic resistor disposed in said bridge arm, the control of said controllable elements being effected so that the resistance value increases responsive to increase of the capacitance value.

8. A circuit arrangement according to claim 7, wherein said controllable capacitor is a fixed capacitor serially connected with a further controllable ohmic resistor, said ohmic resistors being operatively controlled in opposition.

9. A circuit arrangement according to claim 7, wherein a semiconductor diode operating in blocking direction constitutes said controllable capacitor.

10. A circuit arrangement according to claim 9, comprising a current limiting transformer for transforming the capacitive value of said diode.

11. A circuit arrangement according to claim 7, wherein a thermistor constitutes said controllable resistor disposed in said bridge arm.

12. A circuit arrangement according to claim 7, wherein said controllable capacitor is a fixed capacitor serially connected in said transverse branch with a thermistor constituting a further ohmic resistor, said thermistor and said ohmic resistor in said bridge arm being operatively controlled in opposition.

13. A circuit arrangement according to claim 7, wherein a thermistor constitutes said controllable resistor disposed in said bridge arm, said thermistor operating with indirect heating, a transistor amplifier, the heating resistance of said thermistor being disposed in the output circuit of said transistor amplifier, the input terminals of said transistor amplifier forming the control terminals of the controllable resistor.

14. A circuit arrangement according to claim 7, wherein said controllable capacitor is a fixed capacitor serially connected in said transverse branch with a thermistor constituting a further ohmic resistor, said thermistor operating with indirect heating, a transistor amplifier, the heating resistance of said thermistor being disposed in the output circuit of said transistor amplifier, the input terminals of said transistor amplifier forming the control terminals of the controllable resistor, said thermistor and said ohmic resistor in said bridge arm being operatively controlled in opposition.

References Cited by the Examiner

UNITED STATES PATENTS

| | | | |
|---|---|---|---|
| 2,620,402 | 12/52 | Botsford et al. | |
| 3,035,122 | 5/62 | Livingstone | 179—16 |

ROBERT H. ROSE, *Primary Examiner.*

WILLIAM C. COOPER, *Examiner.*